US011614040B1

(12) United States Patent
Bickett et al.

(10) Patent No.: US 11,614,040 B1
(45) Date of Patent: Mar. 28, 2023

(54) COST BASED SUBSTITUTION RATIO CONTROL IN HYDROGEN-CAPABLE INTERNAL COMBUSTION ENGINE SYSTEM

(71) Applicant: Caterpillar Inc., Peoria, IL (US)

(72) Inventors: Steven James Bickett, Cypress, TX (US); Mitchel R Deckard, Montgomery, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/552,717

(22) Filed: Dec. 16, 2021

(51) Int. Cl.
*F02D 41/14* (2006.01)
*F02D 41/00* (2006.01)
*F02C 6/18* (2006.01)
*F02D 35/00* (2006.01)

(52) U.S. Cl.
CPC ..... *F02D 41/0052* (2013.01); *F02D 41/0027* (2013.01); *F02D 41/0055* (2013.01); *F02C 6/18* (2013.01); *F02D 35/0046* (2013.01); *F02D 41/0062* (2013.01); *F02D 41/1473* (2013.01)

(58) Field of Classification Search
CPC ............ F02D 41/0052; F02D 41/0027; F02D 41/0055; F02D 41/0062; F02D 41/1473; F02D 35/0046; F02C 6/18
USPC .... 123/1 A, 3, 27 GE, 525, 198 A, DIG. 12, 123/672, 299, 300, 305
See application file for complete search history.

(56) References Cited

U.S. PATENT DOCUMENTS

| 5,787,864 | A | 8/1998 | Collier, Jr. et al. |
| 7,497,191 | B2 | 3/2009 | Fulton et al. |
| 7,937,948 | B2 | 5/2011 | Zubrin et al. |
| 8,075,869 | B2 | 12/2011 | Zhu et al. |
| 2008/0263955 | A1 | 10/2008 | Lynch et al. |
| 2012/0160221 | A1* | 6/2012 | Munshi ............. F02M 21/0206 123/575 |

FOREIGN PATENT DOCUMENTS

CA          2562363       * 12/2008       ............. F02D 19/08

* cited by examiner

Primary Examiner — Hai H Huynh
(74) Attorney, Agent, or Firm — Jonathan Yates

(57) ABSTRACT

Operating an internal combustion engine system includes combusting gaseous hydrogen fuel and gaseous hydrocarbon fuel at a first substitution ratio in a plurality of cylinders in an engine, inputting an emissions cost value and a hydrogen cost value to a fuel blending control system for the engine, and determining, by way of an electronic control unit of the fuel blending control system, a fuel blending control term based on the respective cost values. Operating the engine system further includes varying admission of at least one of the hydrogen fuel or the hydrocarbon fuel to an intake system for the engine based on the fuel blending control term, and combusting the hydrogen fuel and the hydrocarbon fuel at a second substitution ratio produced by the varied admission in the plurality of cylinders in the engine.

20 Claims, 3 Drawing Sheets

COST BASED SUBSTITUTION RATIO CONTROL IN HYDROGEN-CAPABLE INTERNAL COMBUSTION ENGINE SYSTEM

TECHNICAL FIELD

The present disclosure relates generally to operating an internal combustion engine system, and more particularly to blending hydrogen and hydrocarbon gaseous fuels at a substitution ratio based on emissions and hydrogen fuel cost values.

BACKGROUND

Internal combustion engines are widely used throughout the world for a great many different purposes ranging from vehicle propulsion, operation of pumps and compressors, to electrical power generation. In the oil and gas industry internal combustion engines are indispensable to providing rotational power for on-site gas compression, fluid conveyance, and electrical power generation. The oil and gas industry is undergoing a revolution as investors, markets, and the broader public increasingly look to producers and service providers to limit certain emissions produced by operations in the field. Many well owners and service companies are reviewing carbon emissions associated with their operations, for example, and developing planning strategies to reduce carbon emissions.

The adoption of hydrogen as a fuel source for traditional hydrocarbon based engine systems offers promise for reduction in certain emissions, notably carbon, without the potential impact of conversion to electrically powered equipment. Traditional reciprocating internal combustion engines, however, are typically designed for hydrocarbon based fuels.

In recent years various manufacturers have begun to explore strategies for operating traditional reciprocating engines on hydrogen or hydrogen enriched fuels. One typical traditional engine arrangement employs an internal combustion engine that is configured to operate on gaseous hydrocarbon fuels, generally but not exclusively methane, that can be accessed at a well site or other operating location. In an effort to control certain emissions and optimize efficiency various strategies have been developed over the years that employ multiple fuels. U.S. Pat. No. 7,467,621 is directed to an engine and method for operating an engine, where a combustible combination of reactants supplied to a combustion chamber can include a first hydrocarbon fuel, hydrogen fuel, and a second hydrocarbon fuel. The strategy disclosed in the '621 patent is apparently advantageous in preventing engine misfire. There is ample opportunity for improvement and development of alternative strategies in the art.

SUMMARY

In one aspect, a method of operating an internal combustion engine system includes combusting a mixture containing a gaseous hydrogen fuel (H2) and a gaseous hydrocarbon fuel (HC) at a first H2 to HC substitution ratio in a plurality of cylinders in an engine. The method further includes inputting an emissions cost value and a hydrogen cost value to a fuel blending control system for the engine, and determining, by way of an electronic control unit of the fuel blending control system, a fuel blending control term based on the emissions cost value and the hydrogen cost value. The method further includes varying admission of at least one of the H2 or the HC to an intake system for the engine based on the fuel blending control term, and combusting a mixture containing the H2 and the HC at a second H2 to HC substitution ratio produced by the varied admission of at least one of the H2 or the HC, in the plurality of cylinders in the engine.

In another aspect, an internal combustion engine system includes an engine having a plurality of combustion cylinders formed therein, and a plurality of pistons each reciprocable in one of the plurality of combustion cylinders. The engine system further includes a gaseous hydrogen fuel (H2) admission valve, and a gaseous hydrocarbon fuel (HC) admission valve, and an intake system structured to convey a mixture containing the H2, the HC, and air, to the plurality of combustion cylinders. The engine system further includes a fuel blending control system having an electronic control unit in control communication with the H2 admission valve and the HC admission valve. The electronic control unit is structured to receive an inputted emissions cost value and a hydrogen cost value, and to determine a fuel blending control term based on the emissions cost value and the hydrogen cost value. The electronic control unit is further structured to control the H2 admission valve and the HC admission valve to supply the H2 and the HC to the intake system at an H2 to HC substitution ratio that is based on the fuel blending control term.

In still another aspect, a method of operating an internal combustion engine system includes receiving as inputs to a fuel blending control system an emissions cost value and a hydrogen cost value, and controlling, by way of an electronic control unit of the fuel blending control system, positions of each of a gaseous hydrogen fuel (H2) admission valve and a gaseous hydrocarbon fuel (HC) admission valve. The method further includes forming, based on the controlled positions of each of the H2 admission valve and the HC admission valve, a combustion charge in an engine containing H2 and HC at an H2 to HC substitution ratio that is based on the emissions cost value and the hydrogen cost value, and combusting the combustion charge in the engine.

DETAILED DESCRIPTION

Figure 1:
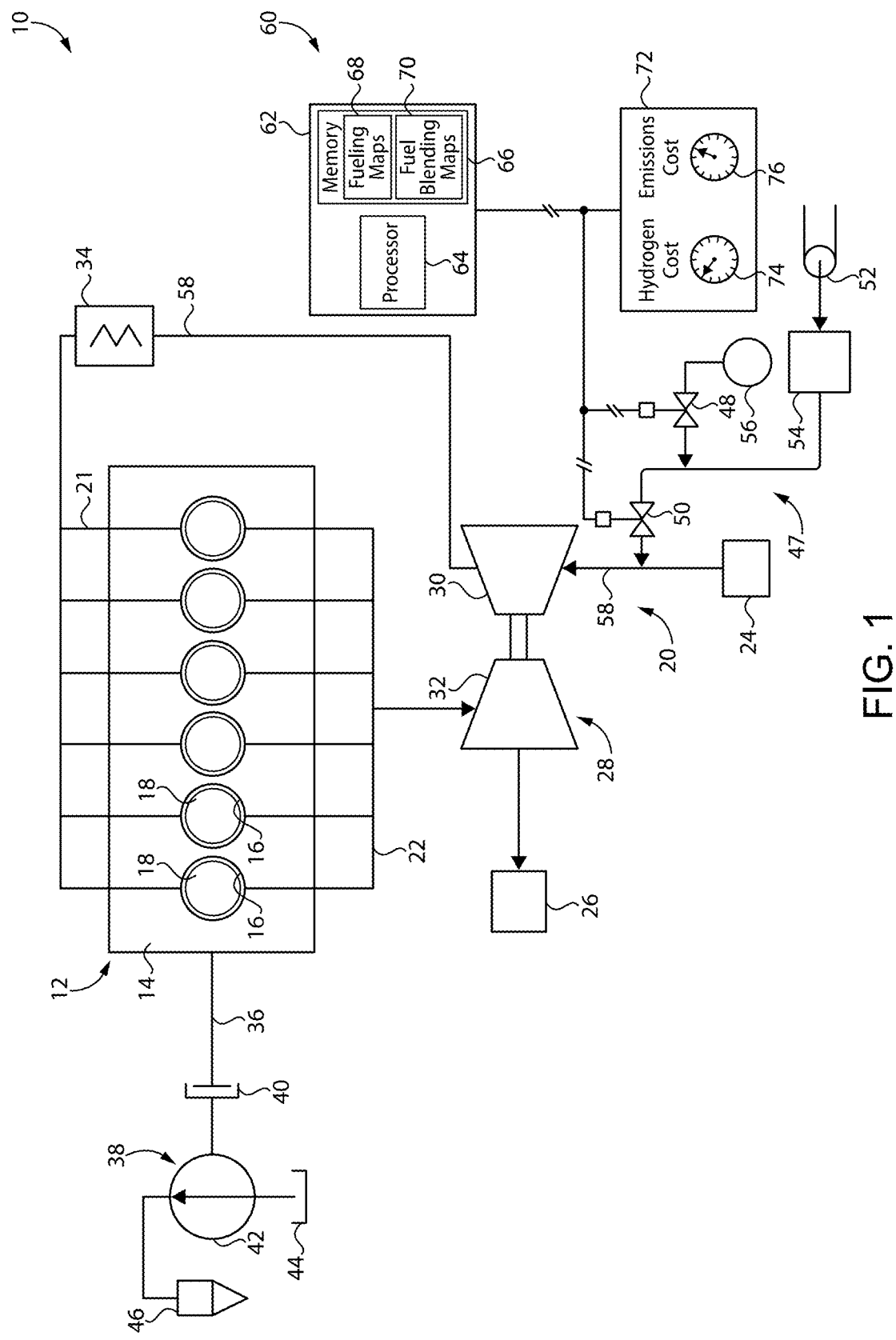
FIG. 1 is a diagrammatic view of an internal combustion engine system, according to one embodiment.

Referring to FIG. 1, there is shown an internal combustion engine system 10 according to one embodiment. Internal combustion engine system 10 (hereinafter "engine system 10") includes an engine 12 having an engine housing 14 with a plurality of combustion cylinders 16 formed therein. A plurality of pistons 18 are each reciprocable in one of combustion cylinders 16. Engine 12 will typically be operated in a conventional four-cycle pattern with pistons 18 each movable between a top dead center position and a bottom dead center position in combustion cylinders 16 in a generally known manner. Although not shown, engine 12 will typically also be equipped with engine valves for controlling fluid connections between combustion cylinders 16 and intake and exhaust apparatus further discussed herein. Combustion cylinders 16 may be in any suitable arrangement such as an in-line pattern, a V-pattern, or still another, and have any suitable number. In an implementation engine 12 is spark-ignited and each of combustion cylinders 16 may be associated with a spark ignition device such as a sparkplug, a prechamber sparkplug, or a prechamber ignition device. Engine system 10 further includes an intake system 20. Intake system 10 includes an intake manifold 21, an air inlet 24 typically including an air filter, and an intake conduit 58 extending fluidly between air inlet 24 and intake manifold 21. Intake runners will typically extend between intake manifold 21 and each combustion cylinder 16. An exhaust manifold 22 is also provided and receives flows of exhaust from combustion cylinders 16 for conveyance to an exhaust outlet 26. Aftertreatment equipment can be positioned fluidly between exhaust manifold 22 and exhaust outlet 26 and can include any suitable or required type of aftertreatment emissions reduction equipment. Engine system 10 also includes a turbocharger 28 having a compressor 30 and a turbine 32. An aftercooler 34 may be positioned in intake conduit 58 to cool a flow of compressed intake air, and other gases including gaseous fuels, to be conveyed to intake manifold 21.

Engine 12 also includes a driveshaft 36 that is rotated by operation of pistons 18 in a generally conventional manner. A clutch 40 may be positioned between driveshaft 36 and a rotated load 38. In the illustrated embodiment load 38 includes a frac pump 42 structured to convey a fluid from a fluid supply 44 to an injector or other delivery device 46 for stimulation of a well. As further discussed herein other loads including but not limited to other pumps, a compressor, or electrical generator may be operably coupled to driveshaft 36.

Engine system 10 further includes a fuel system 47. Fuel system 47 includes a gaseous hydrogen fuel (H2) admission valve 48 and a gaseous hydrocarbon fuel (HC) admission valve 50. Fuel system 47 may also include a gaseous hydrocarbon fuel supply 52 which may include a line gas supply structured to supply a line gas methane feed or other HC feed to intake system 20. Gas processing equipment 54 may be positioned to clean, compress, or otherwise treat a line gas methane feed received from supply 52. Fuel system 47 may also include a hydrogen fuel supply 56. Fuel supply 56 may contain pressurized gaseous H2 or an H2-enriched gaseous fuel, for instance, stored on-site. Gaseous hydrocarbon fuels used for operating engine 12 according to the present disclosure can include natural gas, methane, ethane, landfill gas, mine gas, or any other suitable gaseous hydrocarbon fuel available from natural or manufactured sources. Gaseous hydrocarbon fuels can be supplied from a supply line in a gaseous state or from storage in a compressed or cryogenically liquified state, for example. Gaseous hydrogen fuels, according to the present disclosure, can include gaseous molecular hydrogen or various hydrogen enriched fuels. Hydrogen for use in engine 12 could also be reformed locally from a suitable hydrogen containing material In an implementation line gas supply 52 provides gaseous hydrocarbon fuel as might be available at a natural gas or oil well or other work site. Gaseous hydrogen fuels according to the present disclosure can include gaseous molecular hydrogen or various hydrogen-rich or enriched fuels. Engine system 10 can thus be a stationary engine having a fixed operating location at a work site, mounted on a stationary skid or upon a trailer or the like, although the present disclosure is not thereby limited.

Those skilled in the art will be familiar with the variable and unpredictable costs of gaseous hydrogen fuel, as well as the variable and unpredictable costs of production of certain emissions. As will be further apparent from the following description engine system 10 is uniquely configured for operating engine 12 at a substitution ratio of H2 to HC that can be specified and varied as desired to account for hydrogen costs and emissions costs.

In engine system 10 H2 admission valve 48 and HC admission valve 50 are each arranged to supply H2 and HC, respectively, to intake system 20 at a location that is fluidly upstream of compressor 30. Accordingly, both H2 and HC are admitted into a feed stream of intake air to compressor 30 by fumigation. As can be seen from FIG. 1, H2 admission valve 48 may be electronically controlled and adjusted to open, close, or vary its position, enabling a relative amount of H2 admitted to intake system 20 from fuel supply 56 to be varied. Also in the illustrated configuration HC admission valve 50 can be operated to change its position, open, close, to vary an amount of both HC and H2 that is admitted to intake conduit 58. In various other configurations HC admission valve 50 and H2 admission valve 48 could each separately directly connect to intake conduit 58, or to other parts of intake system 20. Thus, according to the present disclosure an HC admission valve might control admission of not only HC but also H2. Those skilled in the art will envision still other plumbing and fuel delivery arrangements, including alternatives to fumigation that employ pumps and/or compressors to deliver the respective gaseous fuels at various locations. Moreover, in some embodiments as further discussed herein one or both of the H2 or the HC can be delivered at locations downstream of a compressor.

Figure 2:
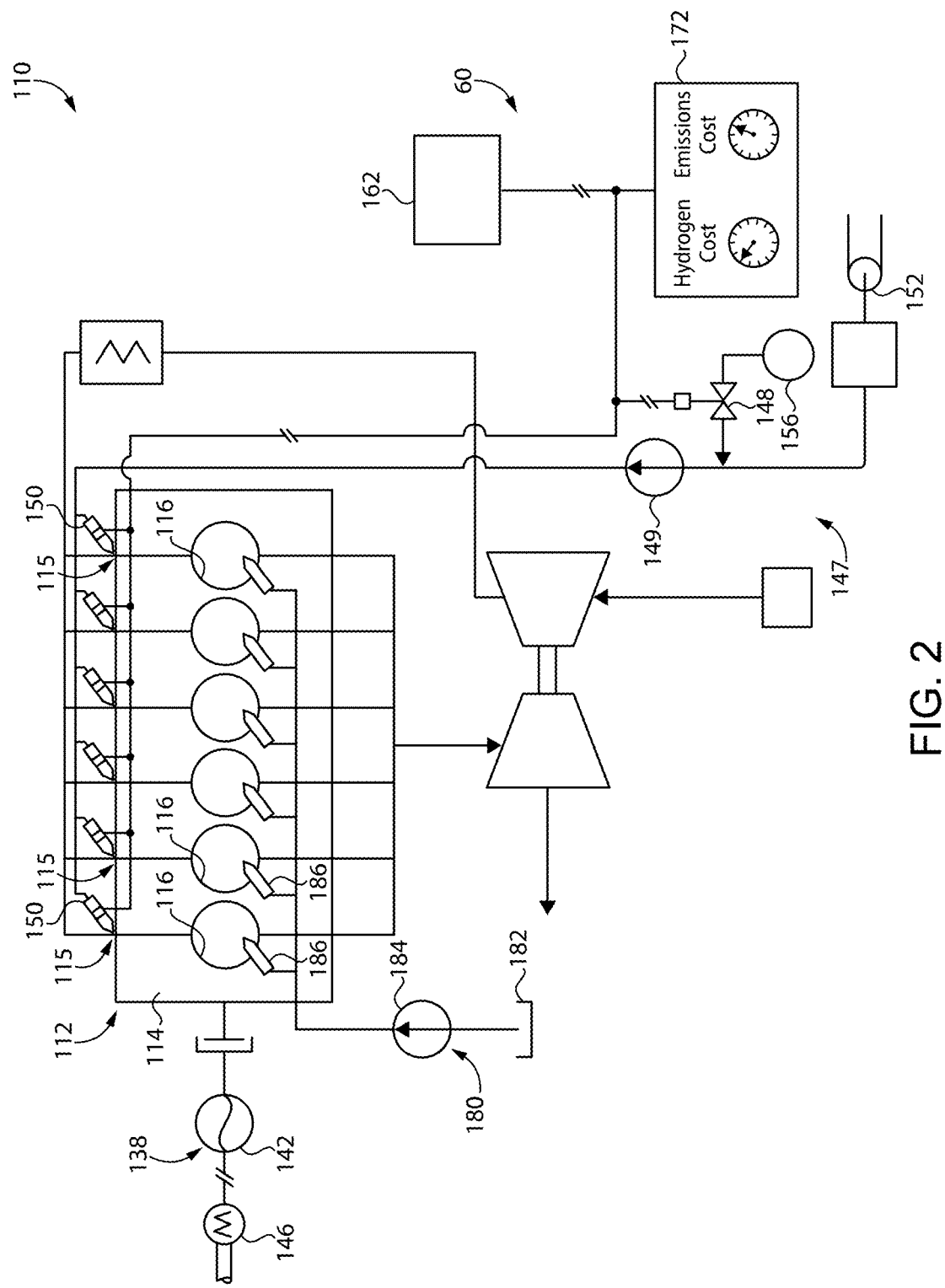
FIG. 2 is a diagrammatic view of an internal combustion engine system, according to another embodiment.

Referring now to FIG. 2, there is shown an internal combustion engine system 110 according to another embodiment. Internal combustion engine system 110 includes an engine 112 having an engine housing 114 with a plurality of combustion cylinders 116 formed therein. Engine system 110 has various similarities with engine system 10 discussed above, but certain differences. Engine 112 can be operated to rotate a load 138 including an electrical generator 142, for example. Electrical generator 142 can be rotated to produce electrical power that operates a motor 146. Electric motor 146 could be used to rotate a pump, a compressor, or any of a variety of other types of equipment. Electrical power generated by electrical generator 142 could also be used to supply a local or regional power grid, for example.

Engine system 110 also includes a fuel system 147 having an HC fuel supply 152 and an H2 fuel supply 156. An H2 admission valve 148 is structured to admit H2 into a feed stream of HC from supply 152 and pressurized by a pump 149. A pressurized mixture of HC and H2 can be conveyed to a plurality of HC admission valves 150 each arranged for port injection of a blended mixture of HC and H2 at a plurality of ports 115 for combustion in combustion cylinders 116. Ports 115 may be formed in intake runners (not numbered) extending to combustion cylinders 16. Thus, in the arrangement of engine system 110 HC admission valves are positioned to admit both H2 and HC at locations fluidly downstream of a compressor in an intake system and fluidly upstream of engine 112. Analogous to the foregoing description of engine system 10 various alternative plumbing arrangements for conveying gaseous fuels to combustion cylinders 116 are contemplated.

Engine system 110 may also include a liquid fuel system 180. Liquid fuel system 180 may include a liquid fuel supply 182 storing, for example, a suitable compression ignition liquid fuel that is pressurized by way of one or more pumps 184 and fed to a plurality of fuel injectors 186 each associated with one of combustion cylinders 116. In other embodiments pressurization of the liquid fuel could occur within fuel injectors 186, such as by operation of a cam. Compression ignition fuels herein may include a diesel distillable fuel, or another liquid fuel with a cetane enhancer, for instance. In a practical implementation engine 112 can be operated to liquid-fuel pilot-ignite a mixture containing H2 and HC in combustion cylinders 116, including mixtures at different substitution ratios of H2 to HC as further discussed herein. Engine system 110 also includes a fuel blending control system 160 having an electronic control unit 162 and a user interface device 172. Fuel blending control system 160 may be similar and operated analogously to systems in engine system 10, and reference is made to that subsequent description. Moreover, it should be appreciated that elements not specifically described but shown in engine system 110 in FIG. 2 may be understood to operate analogously to corresponding apparatus in engine system 10. Any feature or functionality of any one embodiment is also understood to refer to other embodiments herein, except where otherwise indicated or apparent from the context.

Returning focus to FIG. 1, engine system 10 further includes a fuel blending control system 60. Control system 60 includes an electronic control unit 62 in control communication with H2 admission valve 48 and HC admission valve 50. Electronic control unit 62 may include a processor 64 and a computer readable memory 66. Processor 64 can include any suitable programmable logic controller such as a microprocessor or a microcontroller. Computer readable memory 66 can include any suitable computer readable memory such as RAM, ROM, DRAM, SDRAM, EPROM, FLASH, or still another. Computer readable memory 66 stores thereon computer executable instructions which, when executed by processor 64, cause engine system 10 to operate according to the present disclosure. In the illustrated embodiment computer readable memory 66 also stores fueling maps 68 enabling fueling control of engine 12, such as by way of adjustments to an air fuel ratio according to known techniques. Computer readable memory 66 also stores fuel blending maps 70. Fuel blending maps 70 may be used by processor 64 to determine valve positions and/or valve actuation commands such as electrical control currents for H2 admission valve 48 and HC admission valve 50 to attain or adjust a substitution ration of H2 o HC, as further discussed herein.

Control system 60 may also include a user interface device 72. As noted above engine system 10 can be operated in consideration of a cost of hydrogen and/or a cost of emitting certain emissions, including carbon emissions. User interface device 72 can include an H2 cost input device 74 and an emissions cost input device 76. Input devices 74 and 76 could include control knobs, graphics on a graphical user interface, keys, buttons, levers, or any other suitable apparatus or display feature whereby a user can interact with and input information to control system 60. It should be appreciated that in some instances a user can specify a hydrogen cost and an emissions cost when setting up engine system 10 for first placing in service. In other instances a user can interact with control system 60 when engine system 10 is being serviced or retrofitted in anticipation of returning to service, or at any time while engine system 10 is operating and it becomes desirable to adjust a fuel blending ratio of H2 to HC as further discussed herein.

Electronic control unit 62 may be structured to receive an inputted emissions cost value and an inputted hydrogen cost value from user interface device 72. Electronic control unit 62 may be further structured to determine a fuel blending control term based on the inputted emissions cost value and the inputted hydrogen cost value. Electronic control unit 62 may be further structured to control H2 admission valve 48 and HC admission valve 50 to supply H2 and HC to intake system 20 at an H2 to HC substitution ratio that is based on the fuel blending control term. In some embodiments, the emissions cost value and the hydrogen cost value that are inputted can include numerical values. The emissions cost value might represent a monetary cost per unit of emissions, such as dollars per ton of emitted carbon or CO2. Alternatively, the emissions cost value might represent a monetary cost per kilowatt hours of engine power output, for example, or still another measure. The hydrogen cost value could include an actual or estimated cost value of supplying gaseous hydrogen fuel, taking account of a cost of the raw material, a cost of transport and/or storage, a cost of processing, or still other costs. The hydrogen cost value could also be a numerical value such as a value representing a cost of hydrogen fuel per unit volume of hydrogen fuel. In an embodiment the hydrogen cost value and the emissions cost value could be normalized to similar numerical scales, with the fuel blending control term representing a sum or a difference or even in some instances a product of the emissions cost value and the hydrogen cost value. For example, a hydrogen cost value "X" and an emissions cost value "Y" might result in a determined fuel blending control term of "Z".

Directionally, a lower hydrogen cost value and a higher emissions cost value might justify a relatively higher H2 to HC substitution ratio, whereas a higher hydrogen cost value and a lower emissions cost value might justify a relatively lower H2 to HC substitution ratio. In some embodiments other costs, including operating costs of engine system 10 and/or costs of HC depending upon availability, might be included in the determination of a fuel blending control term. In many instances at a well or certain other work sites the cost of HC may be assumed to be zero. The determined fuel blending control term can thus serve as a basis for electronic control unit 62 causing H2 admission valve 48 and HC admission valve 50 to be positioned to provide a desired substitution ratio of H2 to HC.

It is also contemplated electronic control unit 60 may be further structured to adjust at least one of H2 admission valve 48 and HC admission valve 50 to vary the H2 to HC substitution ratio based on the fuel blending control term. In one example electronic control unit 60 can receive the inputted emissions cost value and the inputted hydrogen cost value and determine a fuel blending control term that is directly or indirectly related to a substitution ratio that is a percentage of substitution of H2 for HC. In some embodiments, electronic control unit 60 is structured to vary the H2 to HC substitution ratio in a substitution ratio range from 0% to 25%. It is also contemplated, based on the design and operating capabilities of engine 12, that the substitution ratio of H2 to HC may be sometimes decreased down to 0% and sometimes increased up to a substitution ratio ranging from 20% H2 to 25% H2 by volume, or established at some substitution ratio between 0% and 25% depending upon cost justifications. It will be recalled computer readable memory 66 stores fuel blending map(s) 70. Electronic control unit 62 may be further structured to determine the fuel blending control term from stored fuel blending map(s) 70 having an emissions cost coordinate, a hydrogen cost coordinate, and a fuel blending control term coordinate.

INDUSTRIAL APPLICABILITY

Figure 3:
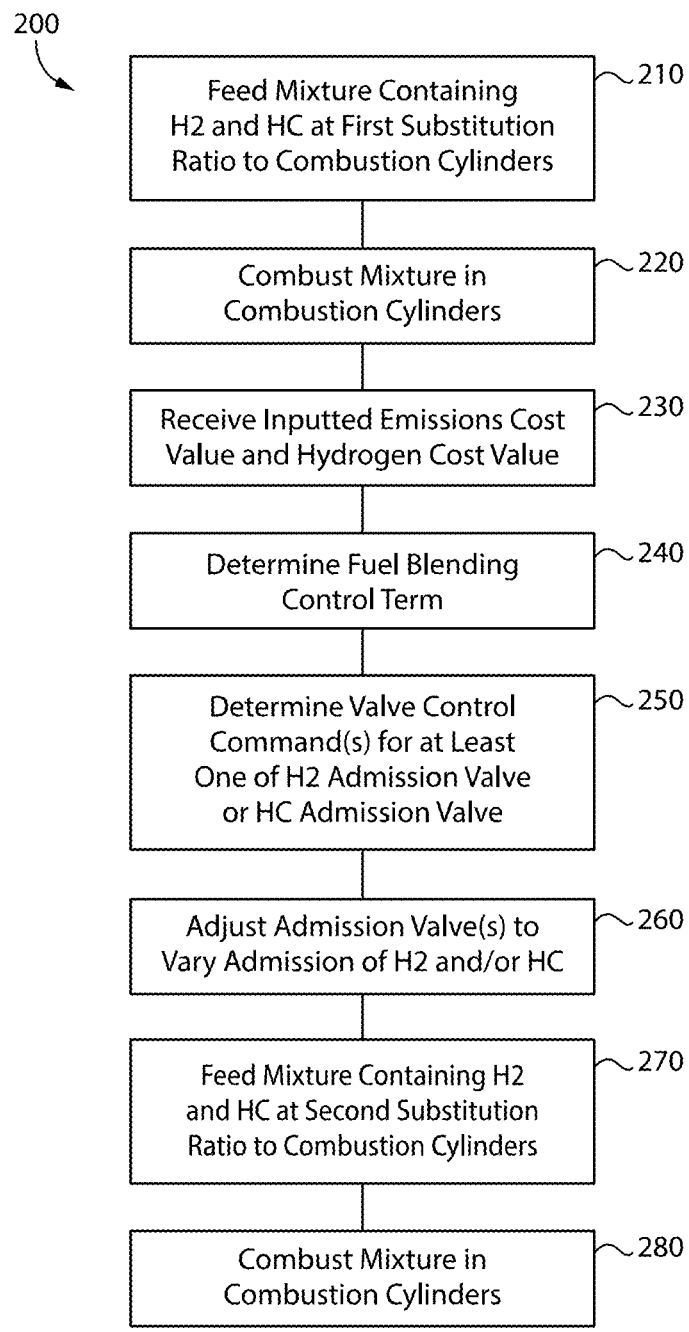
FIG. 3 is a flowchart illustrating example methodology and logic flow, according to one embodiment.

Referring to the drawings generally, but also now focusing on FIG. 3, there is shown a flowchart 200 illustrating example methodology and logic flow according to the present disclosure. At a block 210 a mixture containing H2 and HC at a first substitution ratio of H2 to HC is fed to combustion cylinders 16 in engine 12. From block 210 flowchart 200 advances to a block 220 to combust the mixture containing H2 and HC at the first substitution ratio in cylinder 16 in engine 12. From block 220 flowchart 200 advances to a block 230 to receive inputted emissions cost value and hydrogen cost value. From block 230 flowchart 200 advances to a block 240 to determine the fuel blending control term.

From block 240 flowchart 200 advances to a block 250 to determine valve control commands for at least one of H2 admission valve 48 or HC admission valve 50. As discussed herein the valve control commands can be based on a fuel blending control term, and thus based upon a hydrogen cost value and an emissions cost value. From block 250 flowchart 200 advances to a block 260 to adjust positions of the respective admission valves to vary admission of H2 and/or HC. As discussed above, in the case of engine system 10 of FIG. 1, admission valves 48 and 50 may be adjusted to vary a substitution ratio of H2 to HC in a fuel stream delivered to intake conduit 58 by fumigation at a location upstream of compressor 30. In the case of FIG. 2, admission valves 148 and 150 can be adjusted to vary admission of H2 and HC at a port injection location. In either case, based on the controlled positions of each of H2 admission valve 48 and HC admission valve 50 a combustion charge in combustion cylinders 16 is formed containing H2 and HC at an H2 to HC substitution ratio that is based on the emissions cost value and the hydrogen cost value. From block 260 flowchart advances to a block 270 to feed the mixture containing H2 and HC at the second substitution ratio to combustion cylinders 16. From block 270 flowchart 200 advances to a block 280 to combust the mixture at the second substitution ratio in combustion cylinders 16.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where Only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an internal combustion engine system comprising:
   combusting a mixture containing a gaseous hydrogen fuel (H2) and a gaseous hydrocarbon fuel (HC) at a first H2 to HC substitution ratio in a plurality of cylinders in an engine;
   inputting an emissions cost value and a hydrogen cost value to a fuel blending control system for the engine;
   determining, by way of an electronic control unit of the fuel blending control system, a fuel blending control term based on the emissions cost value and the hydrogen cost value;
   varying admission of at least one of the H2 or the HC to an intake system for the engine based on the fuel blending control term; and
   combusting a mixture containing the H2 and the HC at a second H2 to HC substitution ratio produced by the varied admission of at least one of the H2 or the HC, in the plurality of cylinders in the engine,
   wherein each of the first H2 to HC substitution ratio and the second H2 to HC substitution ratio is 25% or less.

2. The method of claim 1 wherein the engine is a stationary engine having a fixed operating location at a work site, and further comprising supplying a line gas methane feed including the HC to the intake system for the engine at the fixed operating location.

3. The method of claim 2 further comprising rotating a load including a pump, a compressor, or an electrical generator by way of a driveshaft of the engine.

4. The method of claim 1 wherein the varying admission of at least one of the H2 or the HC includes adjusting an H2 admission valve to vary an amount of the H2 admitted into a feed stream containing the HC supplied to the intake system by fumigation.

5. The method of claim 1 wherein the inputting an emissions cost value and a hydrogen cost value includes inputting each respective value on a user interface device of the fuel blending control system.

6. The method of claim 5 wherein the emissions cost value includes a carbon cost value.

7. The method of claim 1 further comprising liquid-fuel pilot-igniting each of the mixture at the first substitution ratio of H2 to HC and the mixture at the second substitution ratio of H2 to HC.

8. An internal combustion engine system comprising:
   an engine having a plurality of combustion cylinders formed therein, and a plurality of pistons each reciprocable in one of the plurality of combustion cylinders;
   a gaseous hydrogen fuel (H2) admission valve;
   a gaseous hydrocarbon fuel (HC) admission valve;
   an intake system structured to convey a mixture containing the H2, the HC, and air, to the plurality of combustion cylinders;
   a fuel blending control system including an electronic control unit in control communication with the H2 admission valve and the HC admission valve and structured to:
      receive an inputted emissions cost value and a hydrogen cost value;
      determine a fuel blending control term based on the emissions cost value and the hydrogen cost value;
      control the H2 admission valve and the HC admission valve to supply the H2 and the HC to the intake system at an H2 to HC substitution ratio that is based on the fuel blending control term,
      adjust at least one of the H2 admission valve or the HC admission valve to vary the H2 to HC substitution ratio based on the fuel blending control term; and
      vary the H2 to HC substitution ratio in a substitution ratio range from 0% to 25%.

9. The system of claim 8 further comprising a user interface device structured to receive as user inputs each of the emissions cost value and the hydrogen cost value.

10. The system of claim 9 wherein the electronic control unit is coupled to the user interface device and structured to determine the fuel blending control term from a stored map having an emissions cost coordinate, a hydrogen cost coordinate, and a fuel blending control term coordinate.

11. The system of claim 10 wherein the emissions cost value includes a carbon cost value.

12. The system of claim 8 wherein each of the H2 admission valve and the HC admission valve is arranged to supply the respective H2 and HC to the intake system at a location that is fluidly upstream of a compressor.

13. The system of claim 8 wherein the HC admission valve is arranged to supply the HC to the intake system at a location that is fluidly downstream of a compressor.

14. The system of claim 8 further comprising a pump, a compressor, or an electrical generator operably coupled to a driveshaft of the engine.

15. An internal combustion engine system comprising:
   an engine having a plurality of combustion cylinders formed therein, and a plurality of pistons each reciprocable in one of the plurality of combustion cylinders;
   a frac pump operably coupled to a driveshaft of the engine;
   a gaseous hydrogen fuel (H2) admission valve;
   a gaseous hydrocarbon fuel (HC) admission valve;
   an intake system structured to convey a mixture containing the H2, the HC, and air, to the plurality of combustion cylinders; and
   a fuel blending control system including an electronic control unit in control communication with the H2 admission valve and the HC admission valve and structured to:
      receive an inputted emissions cost value and a hydrogen cost value;
      determine a fuel blending control term based on the emissions cost value and the hydrogen cost value; and
      control the H2 admission valve and the HC admission valve to supply the H2 and the HC to the intake system at an H2 to HC substitution ratio that is based on the fuel blending control term.

16. The system of claim 15 wherein the electronic control unit is further structured to:
   adjust at least one of the H2 admission valve or the HC admission valve to vary the H2 to HC substitution ratio based on the fuel blending control term.

17. The system of claim 15 wherein the electronic control unit is further structured to:
   vary the H2 to HC substitution ratio in a substitution ratio range from 0% to 25%.

18. The system of claim 15 further comprising a compressor,
   wherein each of the H2 admission valve and the HC admission valve is arranged to supply the respective H2 and HC to the intake system at a location that is fluidly upstream of the compressor.

19. A method of operating an internal combustion engine system comprising:
   receiving as inputs to a fuel blending control system an emissions cost value and a hydrogen cost value;
   controlling, by way of an electronic control unit of the fuel blending control system, positions of each of a gaseous hydrogen fuel (H2) admission valve and a gaseous hydrocarbon fuel (HC) admission valve;
   forming, based on the controlled positions of each of the H2 admission valve and the HC admission valve, a first combustion charge in an engine containing H2 and HC at an H2 to HC substitution ratio that is based on the emissions cost value and the hydrogen cost value;
   combusting the first combustion charge in the engine; and
   increasing, by way of forming a second combustion charge, the substitution ratio of H2 to HC to a substitution ratio ranging from 20% H2 to 25% H2 by volume.

20. The method of claim 19 further comprising determining a fuel blending control term based on the emissions cost value and the hydrogen cost value, and at least one of the controlled positions of the H2 admission valve and the HC admission valve is based on the fuel blending control term.

* * * * *